H. Bagley,
Cage Trap,
N° 42,063. Patented Mar. 29, 1864.

Witnesses:          Inventor:

UNITED STATES PATENT OFFICE.

HENRY BAGLEY, OF MECHANICSVILLE, IOWA.

IMPROVEMENT IN ANIMAL-TRAPS.

Specification forming part of Letters Patent No. 42,063, dated March 29, 1864.

*To all whom it may concern:*

Be it known that I, HENRY BAGLEY, of Mechanicsville, in the State of Iowa, have invented certain new Improvements in the Construction of Traps; and I hereby declare that the following is a true and exact description of the same, reference being had to the accompanying drawings, and to the letters of reference marked thereon.

The nature of my invention consists in the use of certain improved devices in the constructing traps for catching prairie fowl.

Figure 1:
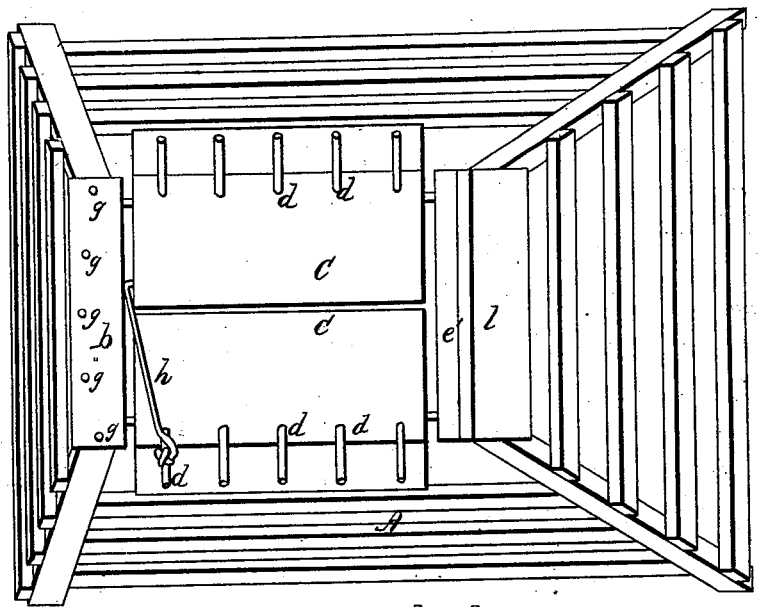
Figure 2:
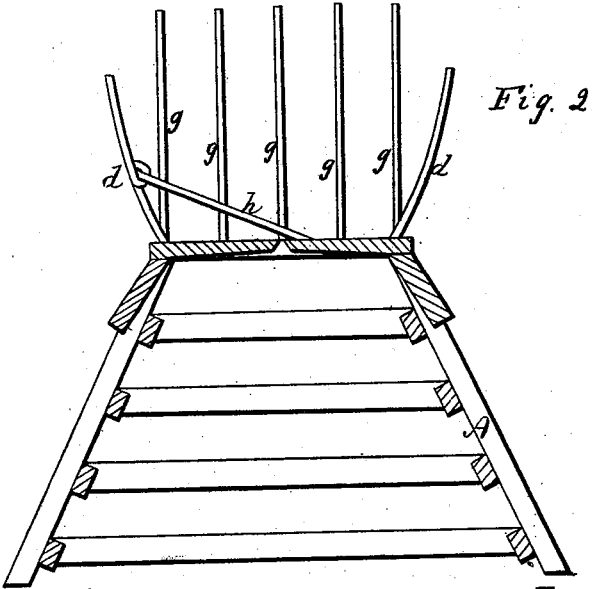

Figure 1 in the annexed drawings represents a plan view of my trap. Fig. 2 gives an end elevation of the same.

The letter A in Fig. 1 represents the body of the trap, and is formed of four corner pieces inclining outward from top to bottom at an angle varying at the two ends. The corner pieces at the end intended for the ascent of the fowl to the top of the trap extend outward at an angle of rather more than forty-five degrees, the angle of inclination of the corner pieces at the other end being less. These corner pieces are bound together at sides and ends by slats placed horizontally and sufficiently near to each other to prevent the birds from escaping between them.

C C represent two trap doors at the top of frame A, and working on pivots in the ties $b$ and $e$. The trap-doors are of the same width and meet midway of the open space at the top of frame A. At the outer edge of the doors C a thick board is nailed in an oblique position to correspond with the shape of frame A, and of sufficient weight to balance the weight of doors C. At the outer edge of door C there are inserted a series of iron rods, $d$, a foot, more or less, in length. The rods $d$ incline outward at small angles and are placed sufficiently near each other to prevent the prairie fowl from getting between them. Similar rods, only a little higher, are inserted in the top of tie $b$, nearly in a vertical position. To the inside of these rods (marked $g$) the ears of corn intended as a bait are fastened. In the outside rod, $d$, next to the tie $b$, an eye is formed by a twist in the rod $x$. Into this eye a hook at the end of connecting rod $h$ is inserted, the opposite end of rod $h$ being bent at right angles so as to enter a hole in the end of the opposite trap door C. The object of rod $h$ is to cause the descent of both doors at the same moment in case the bird should tread on one door in preference to the other.

It will be seen that the arrangement of the rods on doors C and tie $b$ is such that the birds cannot reach the doors except through the open space left at the end fronting tie $e$, and their ascent is then facilitated by the increased inclination of the corner posts at that end, and by the slats nailed to them.

To render it the more certain that the doors will descend by the weight of the bird, a board, $e'$, is nailed to the inner edge of tie $e$, and made to incline a little outward. The bird will first get on the top of this board and then hop down on the door C, which will yield instantly to his weight. At the moment that a bird is falling into the body of the trap it will be noticed that the iron rods $d$, on the opposite doors, will nearly meet at top and thus offer an impassable barrier to birds attempting to make their escape from the body of the trap.

Having thus described my invention, what I claim, and desire to secure by Letters Patent, is—

1. The connecting-rod $h$, constructed and operated as herein set forth.

2. The trap-doors C, the rods $d$ and $g$, and the connecting-rod $h$, the whole arranged and constructed substantially as and for the purpose herein set forth.

In testimony that I claim the foregoing I hereby affix my signature in the presence of two witnesses.

HENRY BAGLEY.

Witnesses:
T. C. McCLELLAND,
JOS. LEE.